United States Patent [19]
Solomon

[11] Patent Number: 5,813,346
[45] Date of Patent: Sep. 29, 1998

[54] ADAPTIVE DRUM BALANCING SYSTEM

[75] Inventor: Yehuda Barnes Solomon, Rishon Lezion, Israel

[73] Assignee: Scitex Corporation Ltd., Herzlia, Israel

[21] Appl. No.: 889,901

[22] Filed: Jul. 8, 1997

[30] Foreign Application Priority Data

Aug. 22, 1996 [IL] Israel ......................................... 119116

[51] Int. Cl.⁶ ............................................................ F16F 5/22
[52] U.S. Cl. ......................... 101/483; 101/375; 74/573 R; 73/470
[58] Field of Search ................................ 73/470; 451/343; 492/9, 60; 29/407.01, 407.05, 407.08; 101/483, 375; 74/573 R

[56] References Cited

U.S. PATENT DOCUMENTS

| | | | |
|---|---|---|---|
| 2,895,766 | 7/1959 | Leopold, Jr. | 301/5.22 |
| 2,958,165 | 11/1960 | Hofmann | 451/343 |
| 3,332,174 | 7/1967 | Behm | 451/343 |
| 5,243,788 | 9/1993 | Rossmann et al. | 51/169 |
| 5,551,339 | 9/1996 | Schadlich et al. | 101/216 |
| 5,688,160 | 11/1997 | Pozetti et al. | 451/5 |

*Primary Examiner*—Edgar S. Burr
*Assistant Examiner*—Dave A. Ghatt
*Attorney, Agent, or Firm*—Mark M. Friedman

[57] ABSTRACT

An apparatus for dynamically balancing a rotating drum mounted in a fixed frame. The apparatus has at least one balancing set, each balancing set includes two weights, each of the two weights is movable along a circular track attached to the drum and substantially concentric with the axis of rotation of the drum, and a mechanism for holding each of the two weights at any fixed position along the track during rotation of the drum.

18 Claims, 5 Drawing Sheets

ADAPTIVE DRUM BALANCING SYSTEM

FIELD AND BACKGROUND OF THE INVENTION

The present invention relates to a rotating drum plotter and, more particularly, to a system for dynamically balancing the drum adaptively to a variety of attached plates.

In the field of graphic arts there are known machines that include a fast rotating drum, onto whose cylindrical surface a sheet of a graphics medium (which may, for example, be a sheet of image carrying paper or film, or a sheet of image-recordable film or paper or a recordable plate) is attached. Such machines are used to rapidly scan the surface of the attached graphics medium in order either to sense (or read) information present thereon or to plot (or write or record) information thereon. In the latter case, the machine is referred to as a rotating drum- (or external drum) plotter. The present invention concerns itself with a particular class of rotating drum plotters, although it is applicable to any such machine and indeed to similar machines in other fields of endeavor. The class of plotters to be discussed is that which enables plotting on printing plates; such plotters are sometimes referred to as Computer-to-Plate (CTP) plotters or Plate Setters. Printing Plates utilized in such plotters are usually made of aluminum or a polymer and are generally coated with a layer sensitive to electromagnetic radiation (of wavelengths anywhere from ultra-violet to infra-red).

In operation, a CTP plotter typically has the plate to be plotted attached to the surface of the drum, by means of a vacuum system, then the drum is made to rotate at speeds of between 1000 and 5000 rpm, while a head, which projects one or more focused beams of radiation onto the plate, is made to slowly travel parallel to its axis over the length of the plate; the intensities of the beams are modulated according to the information to be plotted.

In order to avoid vibration of the fast rotating drum and of the machine of which it is a part, the drum with the attached plate, must be dynamically balanced. This usually means that if the drum is conceptually divided lengthwise into at least two sections (exactly two sections, in case of a perfectly rigid drum), the center of mass of each section must be on the axis of rotation. To the extent that the center of mass is away from the axis, say a distance D, there is in effect exerted, during rotation, a centrifugal force, whose direction is rotating with the drum and whose magnitude is $M*D*\omega^2$, where M is the unbalanced mass and $\omega$ is the angular speed. This rotating force, which is seen to be a strong function of the rotational speed of the drum, can generate vibrations and other undesirable effects and must therefore be eliminated. The quantity $M*D$ at any given situation defines an "unbalance moment". Bringing the total unbalance moment to zero constitutes the process of balancing; since we are concerned with the dynamic effects (i.e., those due to rotation), we also use the more specific term "dynamic balancing".

For any given plate, it is possible to balance the drum by attaching weights to it so that the center of mass everywhere is brought to the axis. If only one type of plate is to be used, then this balancing may be accomplished in the factory and will be permanently effective. Moreover, the circumference of the drum could be made equal to the length of the plate, so that the plate, when attached, forms a complete cylinder, and therefore the center of mass of each cross section lies essentially on its axis. Generally, however, a CTP plotter must serve a large variety of printing plates, differing from each other in size, thickness and basic material. These variations add up to a variability in the mass of the plate (or of any cross section thereof), as well as in the location of its center of gravity relative to the drum's axis. It is thus necessary to rebalance the drum every time that a new type of plate is to be plotted. This is not a trivial task.

In plotters of prior art, various attempts have been made to facilitate the process of balancing. According to one method, a series of weights are attached to suitable receptacles on the drum, a particular set of weights and receptacles being specified for each type of plate. This process is laborious and, being manual, is prone to errors. Additional disadvantages of this and similar methods are: (a) For each new type of plate that is introduced into the market, a new set of weights need be acquired from the factory, or be specially prepared. (b) The method does not compensate for slight variations that may occur between plates of any one type (such as between different manufacturers or different batches); such variations can cause residual imbalance which may generate unacceptable vibrations. The latter possibility could be especially problematic in modern plotters, featuring high rotational speed, on the one hand, and high resolution, and thus greater sensitivity to vibrational errors, on the other hand.

There is thus a widely recognized need for, and it would be highly advantageous to have, a method and apparatus for dynamically balancing drum plotters that would be automatic, inexpensive and easily adaptable to any type of plate and to variations in weight within any type.

SUMMARY OF THE INVENTION

The present invention successfully addresses the shortcomings of the presently known configurations by providing apparatus and a method for easily, and possibly automatically, balancing a rotating drum without the need to attach weights or blankets to the drum and therefore also without the need to stock such items.

The present invention discloses a novel mechanism that enables effecting any desired balancing moment over a continuous range of magnitudes and directions.

More specifically, the balancing mechanism of the present invention, consists essentially of a pair of weights attached to each side face of the drum, which are movable over a circular track and temporarily fixable in any position along that track. The two weights have a common center of mass halfway between them. The distance of the center of mass from the drum's axis (which is also the axis of rotation), and therefore also the magnitude of its moment, is a cosine function of the angle between the radii from the axis to each weight; when the angle is zero, the distance is maximal (and equal to each of the radii); when the angle is 180 degrees, the distance, and thus also the moment, is zero. The direction of the moment, which is the direction from the axis to the common center of mass, is adjustable by moving both weights in common along the track. By judiciously positioning the weights, it is thus possible to effect any moment and particularly a moment that will exactly counter any moment of imbalance present at that plane. The two moments thus effected at the two sides of the drum can be aimed to balance any pair of dynamic imbalance moments acting on the drum, such as produced by an attached plate.

There is also disclosed a preferred embodiment of the balancing mechanism, whereby the weights are movable in a circular groove and held in position by springloaded frictional force. An auxiliary weight mover is instrumental in moving the weights to desired positions by the action of a slowly rotating drum. In addition, a sensor to sense current positions of the weights, in cooperation with readings from an angular encoder attached to the drum, aids in the positioning operation, by providing information on the required direction and length of motion of each weight and thus about the proper timing of operation of the weight movers relative to the drum's rotation.

Thus, after entering into the controlling computer data about the size and weight of the attached plate, the balancing operation can proceed automatically. Moreover, no electrical connections to the drum itself are required for this operation.

According to the present invention there is provided Apparatus for dynamically balancing a rotating drum mounted in a fixed frame, the apparatus comprising at least one balancing set, each balancing set including:

(a) two weights, each of the two weights being movable along a circular track attached to the drum and substantially concentric with the axis of rotation of the drum; and (b) means, preferably of the frictional type, for holding each of the two weights at any fixed position along the track during rotation of the drum.

Preferably there are two balancing sets, whereby each of the circular tracks is associated with one of the two end faces of the drum.

According to further features in preferred embodiments of the invention described below, each of the balancing sets further includes a weight mover attached to the fixed frame and operative to sequentially engage each of the two weights and to be instrumental in moving the weight thus engaged along the track.

According to still further features in the described preferred embodiments, each of the balancing sets further includes a sensor, attached to the fixed frame, for sensing the position of each of the two weights with respect to the track, the drum is coupled to an angular encoder and the system further comprises means for determining, for each balancing set, the position of each of the two weights with respect to the track from the outputs of the encoder and of the respective sensor.

According to another embodiment of the weight position sensing mechanism, the system further includes a pair of markers fixedly attached to the drum at positions along one of the circular tracks, to be sensed by a respective one of the sensors, for determining current position and speed of the drum.

There is also disclosed a method for dynamically balancing a rotational drum mounted in a fixed frame and having a known imbalance moment in at least one plane normal to the drum's geometric axis, the method comprising the steps of:

(i) providing at least one balancing set, each balancing set including two weights, each of the two weights being movable along a circular track attached to the drum and substantially concentric with the geometric axis of the drum and each of the two weights having means for holding it attached to the drum at any fixed position along the track during rotation of the drum;

(ii) obtaining the magnitude and direction of the imbalance moments and calculating therefrom the magnitude and direction of a balancing moment for each of the balancing sets;

(iii) calculating, for each of the balancing sets, desired positions of the two weights along the track, such that would essentially effect the balancing moment; and (iv) for each of the balancing sets, moving the two weights to the respective ones of the desired positions.

According to a refinement of the method disclosed herein, applicable when the imbalance moment is substantially due to a flexible graphics medium attached to the drum, the graphics medium having known size and weight, obtaining the magnitude and direction of the imbalance moments in step (ii) includes calculating the magnitude and direction from the size and weight of the graphics medium.

According to further refinement of the method disclosed herein, there is provided a weight mover and step (iv) further includes slowly rotating the drum to cooperate with the weight mover for moving the at least one of the two weights to the respective one of the desired positions.

According to still further refinement of the method disclosed herein, the positions of the two weights relative to the circular track are sensed for controlling the moving of the weights.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system, including an apparatus and a method, for balancing a rotating drum.

Specifically, the present invention can be used to dynamically balance a rotating drum to which media of varying sizes and weights are attached, the balancing operation being almost entirely automatic, save possibly inputting identifying information into a controlling computer.

The principles and operation of a system according to the present invention may be better understood with reference to the drawings and the accompanying description.

Figure 1:
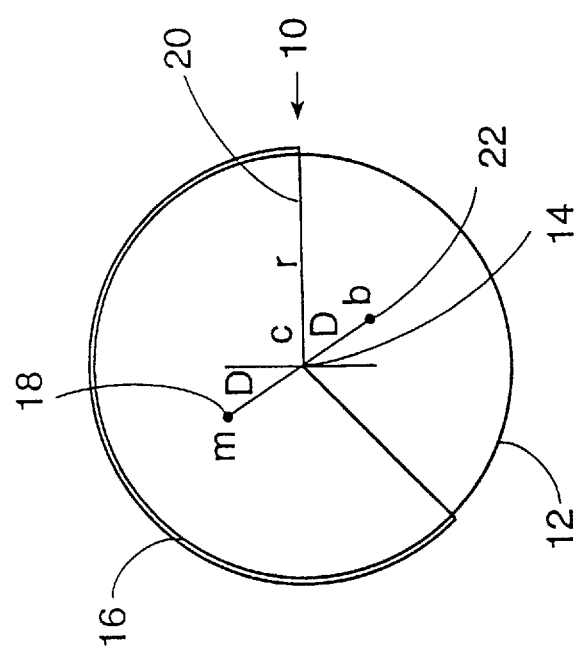
FIG. 1 is a sketch of a plane across the drum, illustrating moments of balance and imbalance.

Referring now to the drawings, FIG. 1 shows schematically a cross section of a typical drum to illustrate the geometric and dynamic relationships involved. To the cylindrical surface 12 of the drum 10, having an axis 14 (normal to the plane of the drawing) through the center point, is attached a plate 16. The axis 14 represents both the geometric axis of the cylindrical surface 12 and the axis of rotation of the drum, which normally are colinear.

The plate 16, which typically extends over a fraction of the drum's circumference, has an axis of mass 18. The term "axis of mass" here means the locus of the centers of mass of all segments of the plate defined by dividing the drum lengthwise through planes normal to the drum's axis. Because of the regularity of the plate's shape (e.g., it being almost universally rectangular), as well as the rigidity of the drum to which it is attached, the axis of mass is almost always a straight line. Moreover, the plate is generally mounted with two edges parallel to the drum's axis and therefore the axis of mass will also be parallel to axis 14.

Although this latter situation will be assumed in the discussion to follow, the invention deals also with more general cases, as will be discussed later on. It is appreciated that the axis of mass may relate also to other masses that are attached to, or are part of, the drum, namely—to the totality of masses that are out of balance. In what follows, however, it is assumed that the drum itself is perfectly balanced and that any imbalance is due solely to the attached plate.

Since we assume, for now, that the axis of mass is parallel to the axis of the drum and that, furthermore, the rectangular plate is centered with respect to the length of the drum, we will consider only the situation within the middle plane, i.e., the plane normal to the drum's axis and at the middle of its length dimension; by symmetry considerations, the center of mass must be within this plane, which is represented by the drawing of FIG. 1. Then, the plate 16 has a center of mass 18, at the point m, which is a certain distance D from the center of rotation, 14, marked by point c. The imbalance moment, I, due to the plate, has a magnitude $P*D$, where P is the mass of the plate; its direction is given in terms of an angle $\theta$ between the line mc and a reference line 20, marked r, which is at a fixed orientation with respect to the drum.

Now, if a weight of mass $M=P$ were added to the drum (again, symmetrically with respect to its middle) so that its center would be at a point 22, marked b, that is diametrically opposite point m (18), the drum would become balanced. This point too is at a distance D from the center of rotation c. We define a "balancing moment" B, such that its magnitude is, again, $P*D$ and its direction is radial from the drum's geometric axis, forming an angle $180°-\theta$ with the reference line, r. Thus, in vector notation, $B=-I$. Clearly, any mass that is added to the drum so as to produce a balancing moment B would dynamically balance the drum. For example, a mass $M=2P$, centered on a point halfway between c and b, would effect a balancing moment B (since its magnitude would be $2P*D/2=P*D$) and would thus balance the drum. As another example, two weights, each with a mass of P, could be placed each on a side of the drum, at a point congruent with the point (on the middle plane) halfway between c and b, to effect the same balancing moment B.

Figure 2:
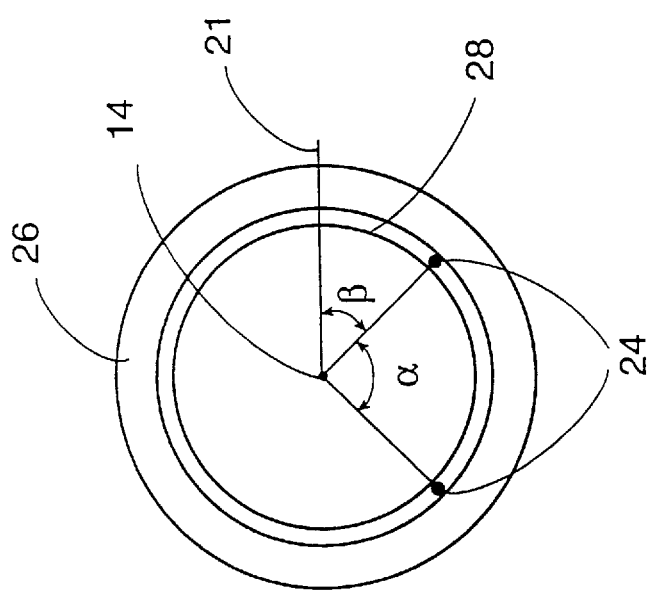
FIG. 2 is a schematic drawing of a side of the drum, showing the principles of the invention.

We now turn to FIG. 2, which is a schematic representation of a side 26 of the drum 10, which generally has a plane surface normal to the axis. There are shown two weights 24 attached to the side 26 of the drum. The weights 24 are movable along a circular track 28, but their positions along the track are normally fixed—particularly during the fast rotation of the drum. Preferably the masses of the two weights are equal; we denote the mass of each weight by W. A radius is conceptually drawn from the center of mass of each weight to the axis 14; the length of this radius is denoted by R. In the positions shown, the two radii form an angle $\alpha$ between them, while the angle between one of the radii and a reference radius 21 is $\beta$; the reference radius 21 corresponds to, and is parallel with, the reference line 20 (FIG. 1). The two weights have a combined mass of 2W and their combined center of mass lies at a point w halfway between them. The length of the radius from the axis to the center of mass, w, is $R*\cos(\alpha/2)$. Thus, the two weights effect a moment whose magnitude is $2W*R*\cos(\alpha/2)$ and whose direction is at an angle $\beta+\alpha/2$ from the reference radius. It is noted that, by choosing a value for $\alpha$ between 0 and 180 degrees, any moment magnitude between $2W*R$ and 0 can be effected, and by then choosing a value for $\beta$, any direction of the moment can be effected.

A similar arrangement, to be referred to as a balancing set, is also on the other side of the drum; preferably, the weights there are also of a mass W each and are movable on a track at a radius R. Under the simplifying conditions assumed, i.e., the axis of mass of the plate being parallel to the axis of rotation, the weights on the two sides will always be placed at congruent positions; that is, when their positions are projected onto a single plane, parallel to the sides of the drum, such as that represented in FIG. 2, they will be identical. Then the combined moment of the four weights at the middle plane (FIG. 1) will have a magnitude of $4W*R*\cos(\alpha/2)$ and a direction at an angle $\beta+\alpha/2$ from the reference line 20. Clearly, by choosing appropriate values for $\alpha$ and $\beta$, the desired balancing moment B can be effected. These values of $\alpha$ and $\beta$ would satisfy the equations $$4W*R*\cos(\alpha/2)=P*D$$

$$\beta+\alpha/2=180°-\theta.$$

The value of P, the mass of the attached plate, is generally known; the values of D and $\theta$, which represent the polar position of the center of mass of the plate, as mounted, may generally be computed from the radius of the drum and from the circumferential dimension of the plate and its circumferential position on the drum relative to the reference direction; it is assumed that the plate is uniform (i.e., that its mass per unit area is constant), which is generally the case. It is noted that the radius of the drum is constant and that also the plate position will usually be constant, since it is usually determined by a mechanical guide; the weight and size of each type of plate need, generally, be measured once; thus the values of $\alpha$ and $\beta$ need be computed only once for each type of plate (or possibly for each batch of plates). It is also noted, however, that in any case, within the scope of the present invention, the imbalance moment, and therefore also the required balancing moment, are assumed to be known; this is also true for the more general application of the invention to cases where the imbalance is not due solely to an attached plate.

If the plate is not centered with respect to the drum's length, then its center of mass will lie in a cross plane other than the middle plane. In this case, the contribution of the weights on each side of the drum to the total balancing moment will not be equal, but rather inversely proportional to the distance of the center of mass from the respective side. For example, if the length of the plate is half of that of the drum and the plate is mounted flush with, say, the left end of the drum, its center of mass will be ¼ of a drum's length from that end; then the left-hand weights have to effect a balancing moment with a magnitude of 0.75 that of B, and the right-hand weights—0.25 that of B; thus, the first of the above equations would then be $2W*R*\cos(\alpha/2)=0.75*P*D$, for the left end, and $2W*R*\cos(\alpha/2)=0.25*P*D$, for the right end—making $\alpha$ smaller on the left than on the right.

If the plate is mounted skewed, its axis of mass will not be parallel to the axis of rotation. In this case there will also be a moment of wobble, which can be corrected only by a pair of differentially oriented balancing moments. That is, the balancing moment effected by the weights at one end needs to have a direction different from that effected at the other end. The present invention provides also for such a possibility, to the extent that the correct magnitude and direction of each balancing moment is known or calculated by the operator.

The circular tracks, over which the weights are movable, have been shown in one, preferred, configuration, namely associated with the sides of the drum, as in FIG. 2. Another possible configuration has the circular tracks associated with the cylindrical surface of the drum. In such a configuration there may be more than two balancing sets, and moreover, their positions along the drum may be chosen as needed. This arrangement could have an advantage, for example, in cases that the drum may not be considered to be perfectly rigid (as has been implicitly assumed in the discussion hereabove) and therefore the effects of various imbalance moments along its length (e.g., bending) need be considered and counter balanced.

Figure 3:
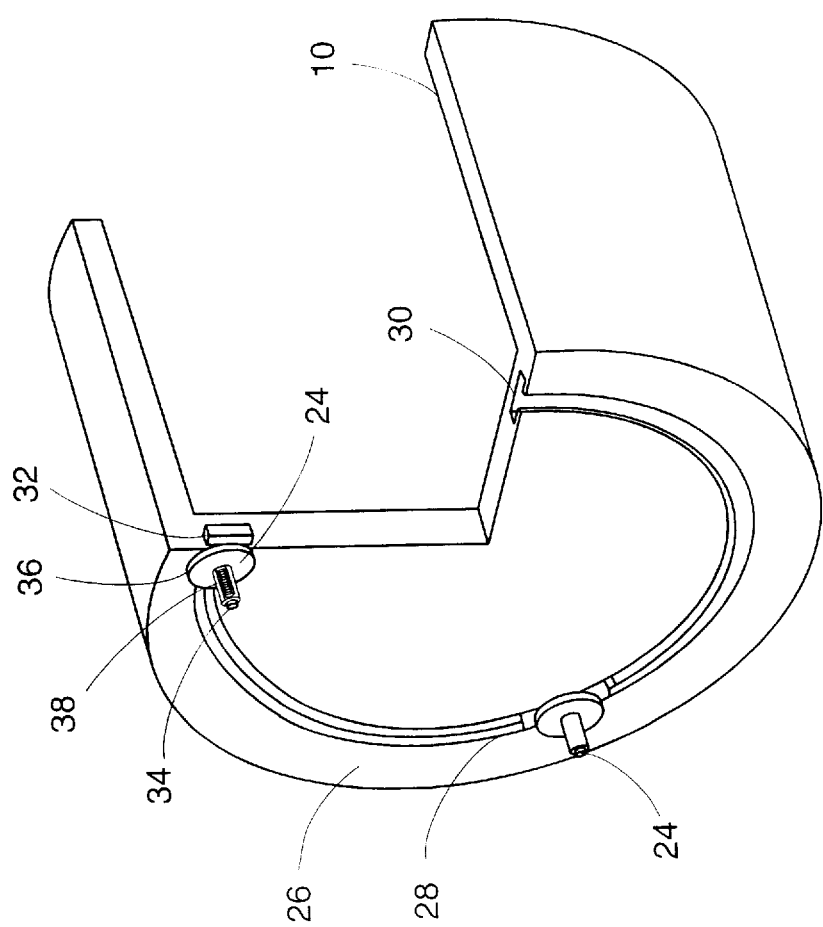
FIG. 3 is a partially cut isometric drawing of an end section of a drum, showing a preferred embodiment of the invention.

Reference is now made to FIG. 3, which is a partially cut isometric drawing of an end section of a drum 10, including a side face 26, and shows a preferred embodiment of the invention. The circular track 28 is embodied as a groove 30 cut into the side face. The groove has an inverted T-shaped cross-section, forming a widened buried portion, as shown in the drawing. Each of the two weights 24 consists of an anchor 32, slidable along the buried portion of the groove, to which is attached a stem 34, protruding from face 26; on stem 34 rides a ring-shaped platelet 36, which is pressed against face 26 by a spring 38. The face of platelet 36 that is in contact with end face 26 of the drum is coated with a frictional material, such as wood, leather or cork. The pressure exerted by spring 38 is such that the resulting friction is enough to keep the weight fixed in its place during rotation of the drum, yet will allow moving the weight along the track by a reasonable circumferential force. It is appreciated that other mechanical arrangements known in the art may also be employed to achieve the same effects and that they would come within the scope of the present invention.

Figure 4:
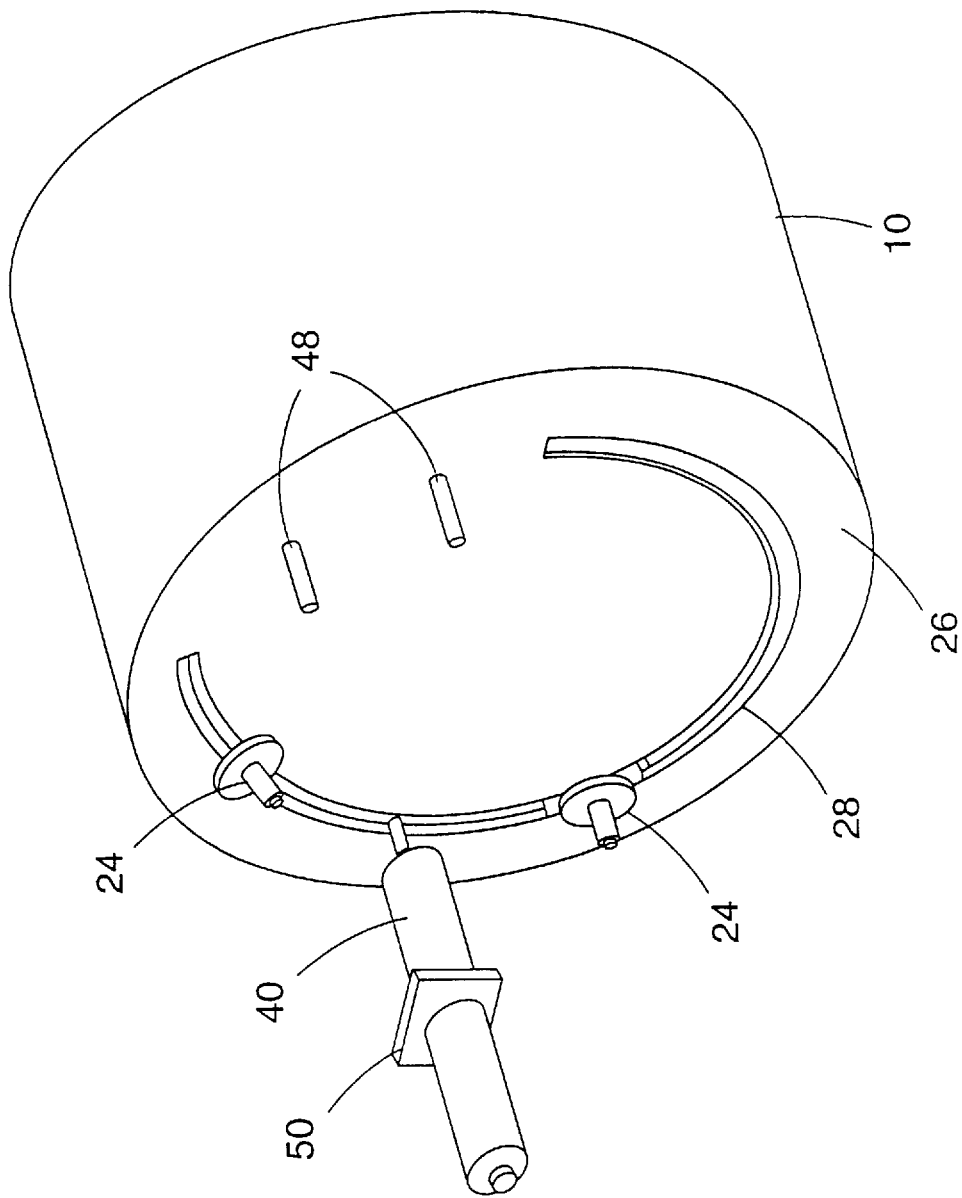
FIG. 4 is a schematic isometric drawing of a drum, showing further features of the preferred embodiment of the invention.
Figure 5:
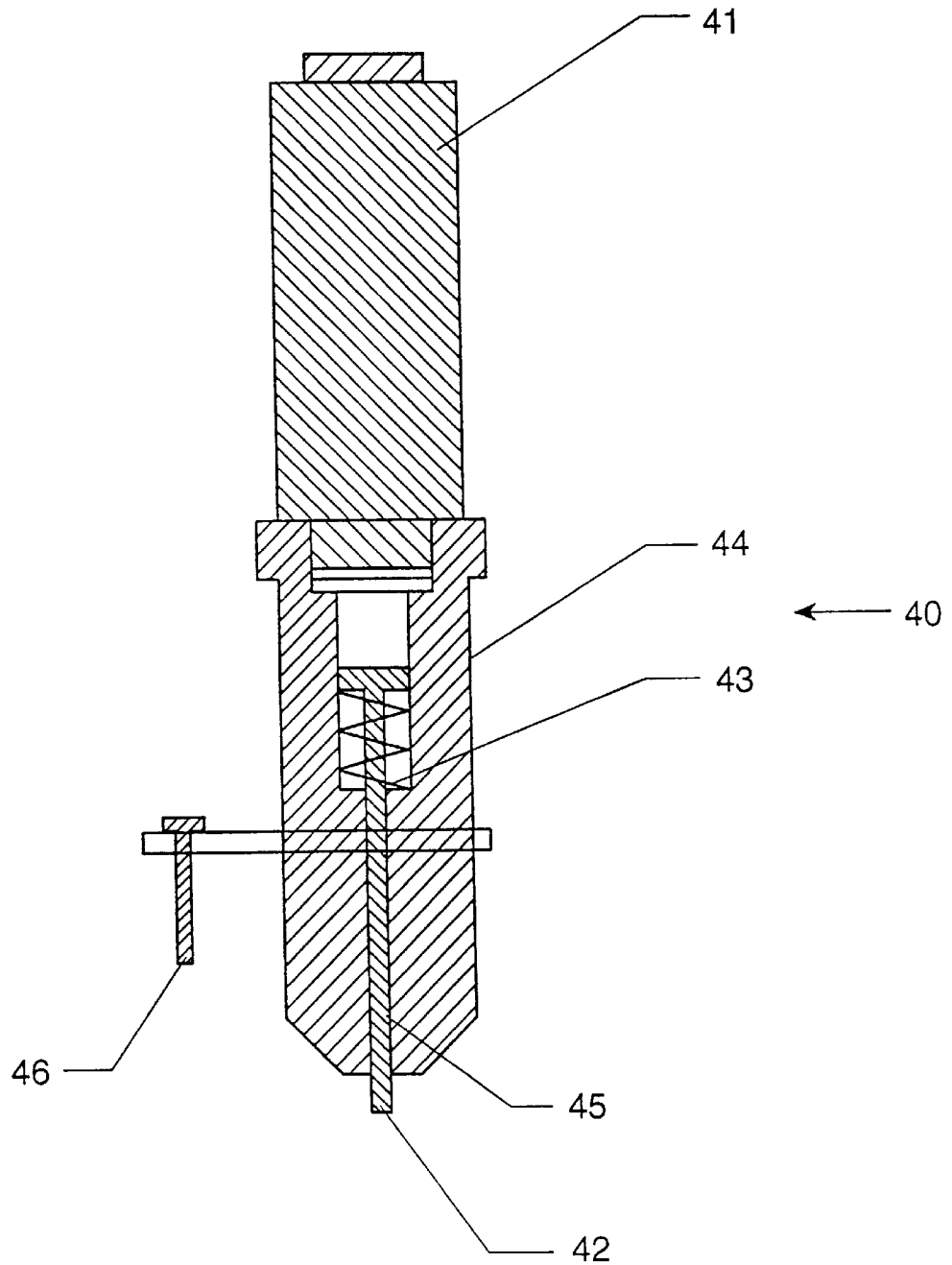
FIG. 5 is a longitudinal sectional drawing of the weight mover of FIG. 4.

In a manual configuration of the preferred embodiment, the weights are moved and positioned manually. Exact positioning at the angles α and β is aided by a protractor (not shown) drawn on face 26, with the angle 0 marked at the reference direction. In an automatic configuration of the preferred embodiment, illustrated in FIG. 4, there is provided, with each balancing set, a mechanism 40, to be referred to as weight mover, which is mounted near the end face of drum 10 on a base 50 that is attached to the frame of the machine. A longitudinal sectional view of weight mover 40 is shown in FIG. 5. There is provided an elongated housing 44, with a hole 45 through its end. An arm 42, movable along its own axis in a direction normal to end face 26 of the drum, protrudes through hole 45 but its base is kept inside the housing and pushed inward by a spring 43. A solenoid 41 is attached to housing 44 and is operative so that when an electric current flows through its coil, its armature pushes arm 42 outward, overcoming the force of spring 43. When arm 42 is pushed out, by the action of solenoid 41, its end is near track 28 and in the path of the stems of weights 24. This end of arm 42 is shaped so that, when the drum rotates slowly, the end engages the stem of the approaching weight, causing it to halt and therefore to change its position along the track while the drum continues to rotate; a similar action takes place when the drum rotates in a reverse direction. It is appreciated that also other mechanical arrangements known in the art may be employed to achieve the same effects and that they would come within the scope of the present invention; as particular examples, the end of the arm could alternatively be made to swing parallel to face 26 between a position in the path of the weights and a position outside that path, or still alternatively, the whole arm may be mounted so as to move in a plane parallel to the end face.

It is also appreciated that configurations of a balancing set similar to those described hereabove are applicable to the case that the circular track is associated with the cylindrical surface of the drum, as already suggested.

Preferably there is also included, with each balancing set, a sensor 46, which may be mounted on, or with, the weight mover. The sensor, which may operate by optical, electrostatic or electromagnetic effects, is mounted so as to be near the path of the weights and serves to sense the position of each weight. Preferably, the drum is also coupled to, or is equipped with, an angular encoder, which continuously outputs the angular position of the drum; such an encoder is usually a part of a plotter or any graphic machine.

Automatic operation proceeds as follows: The drum is first made to rotate slowly one or more revolutions while the sensors are activated; sense indications from the sensors trigger reading out the concurrent angular positions of the drum, thus indicating the current position of each weight relative to the drum (or to the reference line 20). Next, the desired position of each weight, as calculated to achieve balance, is compared with its current position. Then the drum is made to continue rotating slowly in the first direction; if any weight must be moved in a counter direction to reach the desired position, the arm of the corresponding balancing set is extended in due time to intercept it and the drum rotates until the weight reaches the correct angular position, at which point the arm is retracted, disengaging the weight; it may also be necessary to stop the drum at that position while the arm is being retracted. Finally, the drum is rotated in the opposite direction, to similarly move, as required, any weight in the opposite counter direction to its desired position. The machine is then in balance and ready for regular operation.

If no encoder is available, an alternative configuration may be employed as follows (see FIG. 4): Two markers 48 are placed on a side face of the drum at fixed positions on the circular track, such that would never be traversed by the weights. The markers can be sensed by sensor 46 so as to generate therein a different signal than that from the weights. In operation, the drum is made to rotate at some constant speed and the sensor is activated. From the relative times of the markers sense signals, the drum's speed is calculated; then from the times of the weight sense signals relative to one of the marker signals, their relative positions are calculated.

In summary, it has been shown that the invention provides apparatus and methods for easily and possibly automatically balancing a rotating drum, the balancing effect being continuously adaptable to any imbalance moments, such as effected by a large variety of attached printing plates or other graphics media. It is noted that in the preferred embodiment, no electrical connections to the drum are required to achieve automatic balancing. Moreover, the automatic mode of balancing operation can be controlled entirely from the computer that normally controls operation of the drum, by simply entering the appropriate data regarding the plate currently attached, such as size and weight figures. If such data for particular types of plates have been preloaded, then all that is required of the operator is to enter a plate-identifying word. Even the latter action could be automated in automatic loading plotters by having the plates or their casette carry identifying marks—to be read by a suitable sensor.

While the invention has been described with respect to a limited number of embodiments, it will be appreciated that many variations, modifications and other applications of the invention may be made.

What is claimed is:

1. A dynamically balanceable rotating drum system, comprising:

a fixed frame;

a cylindrical drum, rotatably mounted in said frame; and
at least one balancing set, each balancing set including:
- a groove, fixedly associated with a face of said drum and formed along a circle, concentric with said drum;
- at least one weight assembly, each weight assembly slideably mounted in said groove and including at least one moving engagement member, said moving engagement member normally moving in a circular path, concentric with said drum, when said drum rotates;
- a weight mover, attached to said fixed frame, said weight mover including at least one fixed engagement member and being switchably operative to dispose any of said least one fixed engagement member in said circular path of a corresponding one of said at least one moving engagement member;
- friction means between each of said at least one weight assembly and said groove, said friction means exerting on the corresponding weight assembly a circumferential frictional force, such that allows the weight assembly to slide along said groove, when said drum rotates and said fixed engagement member is disposed in said circular path of said corresponding moving engagement member, and such that keeps the weight assembly at any fixed position along said groove, otherwise.

2. The system of claim 1, further comprising means for causing said drum to rotate to, and stop at, any specified angular position.

3. The apparatus of claim 1, wherein said groove extends along only part of said circle.

4. The apparatus of claim 1, wherein said groove is fixedly associated with the cylindrical face of said drum.

5. The system of claim 1, wherein each of said balancing sets further includes a weights sensor, attached to said fixed frame, operative to sense the proximity of any of said at least one weight assembly during rotation of said drum.

6. The system of claim 5, further comprising:
- an angular encoder, coupled to said drum; and
- calculating means, operative to determine, for each balancing set, the angular position of each weight assembly, with respect to said groove, from the outputs of said encoder and of the respective weights sensor.

7. The system of claim 5, further comprising:
- a pair of markers fixedly attached to said drum and senseable by the respective weights sensor of one of said balancing sets; and
- calculating means operative to determine, for each balancing set, the angular position of each weight assembly with respect to said groove from the outputs of the respective weights sensors.

8. The apparatus of claim 5, further comprising:
- a pair of markers, fixedly attached to said drum;
- a marker sensor, attached to said fixed frame and operative to sense the proximity of each of said markers; and
- calculating means, operative to determine, for each balancing set, the angular position of each weight assembly with respect to said groove from the output of the respective weights sensor and of said marker sensor.

9. A method for dynamically balancing a rotational drum plotter, the plotter including a fixed frame and a cylindrical drum, rotationally mounted therein, the drum being equipped to have a plate attached to its cylindrical face at a known position, any plate thus attachable belonging to any one of a limited set of plate types, each plate type characterized by a plate size and weight, the method comprising the steps of:

(i) providing at least one balancing set, each balancing set including:
- a groove, fixedly associated with a face of said drum and formed along a circle, concentric with said drum:
- at least one weight assembly slidably mounted in said groove and including at least one moving engagement member, normally moving in a circular path, concentric with the drum, when the drum rotates; and
- friction means between each weight assembly and said groove, said friction means exerting on the respective weight assembly a moderate circumferential frictional force (ii) providing data storage means and storing therein, for each plate type, the values of angular positions of all of said weight assemblies, relative to their respective grooves, such that would essentially effect a dynamic balance of the drum when a plate of the respective type is attached thereto;

(iii) attaching a plate of a known type to the drum;

(iv) reading from said storage means those of said angular position values that correspond to the plate attached in step iii:

(v) for each of said at least one weight assembly moving the weight assembly to, or keeping it at, as the case may be, the position indicated by the respective value read in step iv.

10. The method of claim 9, wherein each of said at least one balancing set further includes a weight mover, attached to said fixed frame and including at least one fixed engagement member, the weight mover being switchably operative to dispose any fixed engagement member in the circular path of a corresponding moving engagement member, and wherein step (v) includes, for any weight assembly to be moved:
- angularly orienting the drum for appropriate angular relation between said weight assembly and said weight mover;
- operating said weight mover so that a fixed engagement member thereof is disposed in the path of a moving engagement member of said weight assembly; and
- rotating the drum so as to engage said moving engagement member with said fixed engagement member and to thus cause said weight assembly to slide along its respective groove until reaching said indicated position.

11. The method of claim 10, wherein each of said at least one balancing set further includes a weights sensor, attached to said fixed frame and operative to sense the proximity of any weight assembly during rotation of the drum, and wherein step (v) further includes, as preliminary substeps:
- rotating the drum so as to cause said weights sensor to sense the proximity of each weight assembly; and
- calculating from the output signals of said weights sensor the angular position of each weight assembly sensed, relative to its respective groove.

12. A dynamically balanceable rotating drum plotter, comprising:
- a fixed frame;
- a cylindrical drum, rotatably mounted in said frame and equipped to have a plate attached to its cylindrical face at a known position, any plate thus attachable belonging to any one of a limited set of plate types, each plate type characterized by a plate size and weight;

at least one balancing set, each balancing set including:
- a groove, fixedly associated with a face of said drum and formed along a circle, concentric with said drum;
- at least one weight assembly, slideably mounted in said groove;
- friction means between each weight assembly and said groove, for exerting on the corresponding weight assembly a moderate circumferential frictional force;
- data storage means for storing therein, for each plate type, the values of angular positions of all of said weight assemblies, relative to their repective grooves, such that would essentially effect a dynamic balance of the drum with an attached plate of the respective type.

13. The plotter of claim 12, wherein each weight assembly further includes at least one moving engagement member, said moving engagement member normally moving in a circular path, concentric with said drum, when said drum rotates, and each balancing set further includes a weight mover, attached to said fixed frame, said weight mover including at least one fixed engagement member and being switchably operative to dispose any fixed engagement member in the circular path of a corresponding moving engagement member.

14. The plotter of claim 13, wherein moderate circumferential frictional force is such that allows the respective weight assembly to slide along said groove, while said drum is rotating and the respective moving engagement member is in contact with a corresponding fixed engagement members, and such that keeps the weight assembly at any fixed position along said groove, otherwise.

15. The plotter of claim 12, wherein each attachable plate is marked as to its type, the plotter further comprising a mark reader, operative to read the mark on any plate attached to said drum and to issue a corresponding identifying signal to said data storage means.

16. The system of claim 12, wherein each of said balancing sets further includes a sensor, attached to said fixed frame, operative to sense the proximity of each of said weight assemblies during rotation of said drum.

17. The apparatus of claim 12, wherein said groove extends along only part of said circle.

18. The apparatus of claim 12, wherein said groove is fixedly associated with the cylindrical face of said drum.

* * * * *